Sept. 18, 1956 W. I. MARSALIS 2,763,489
HAND TRUCK PROVIDED WITH TRACK TYPE TREADS
Filed June 12, 1952 2 Sheets-Sheet 1
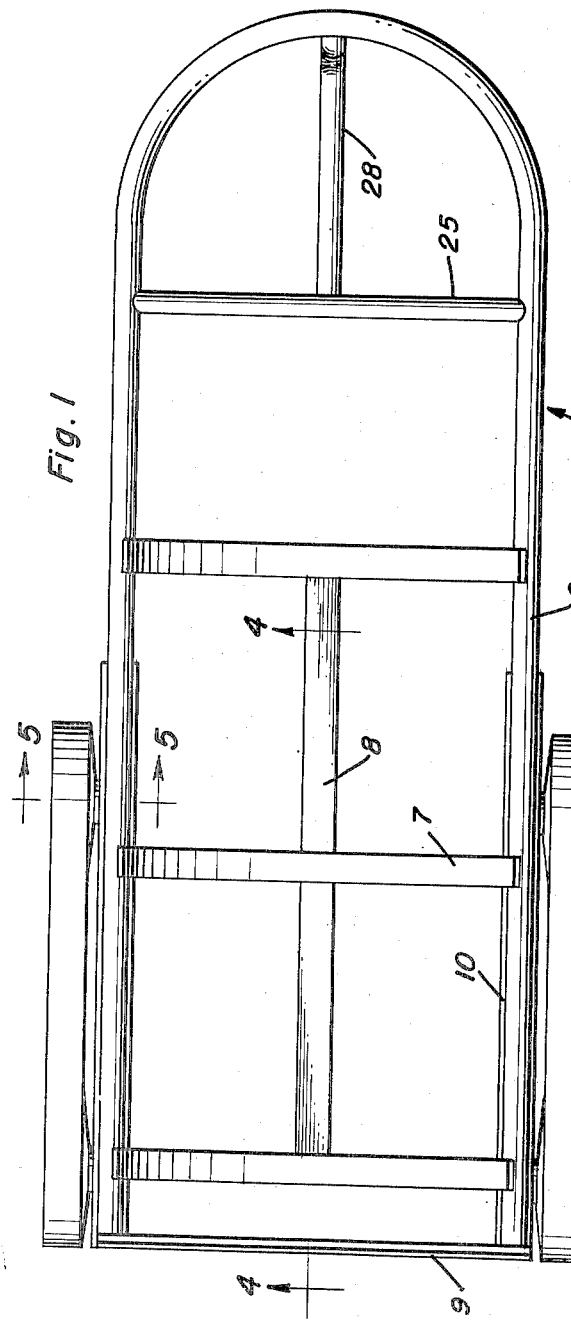
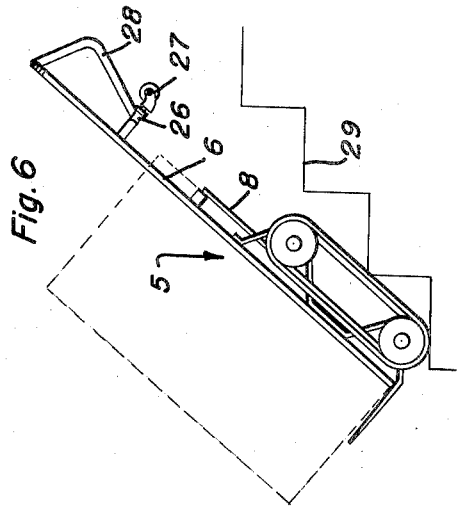
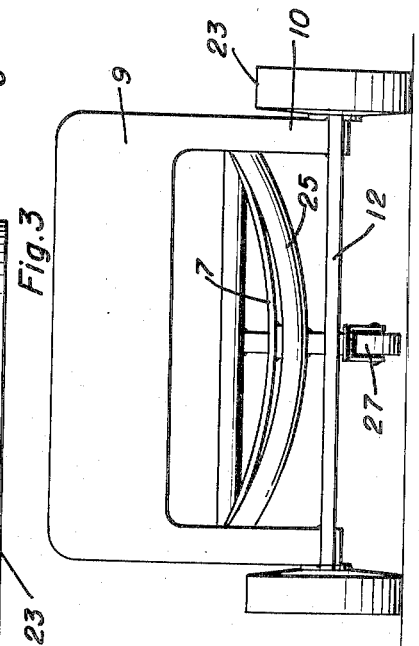
William I. Marsalis
INVENTOR.

Sept. 18, 1956 W. I. MARSALIS 2,763,489
HAND TRUCK PROVIDED WITH TRACK TYPE TREADS
Filed June 12, 1952 2 Sheets-Sheet 2
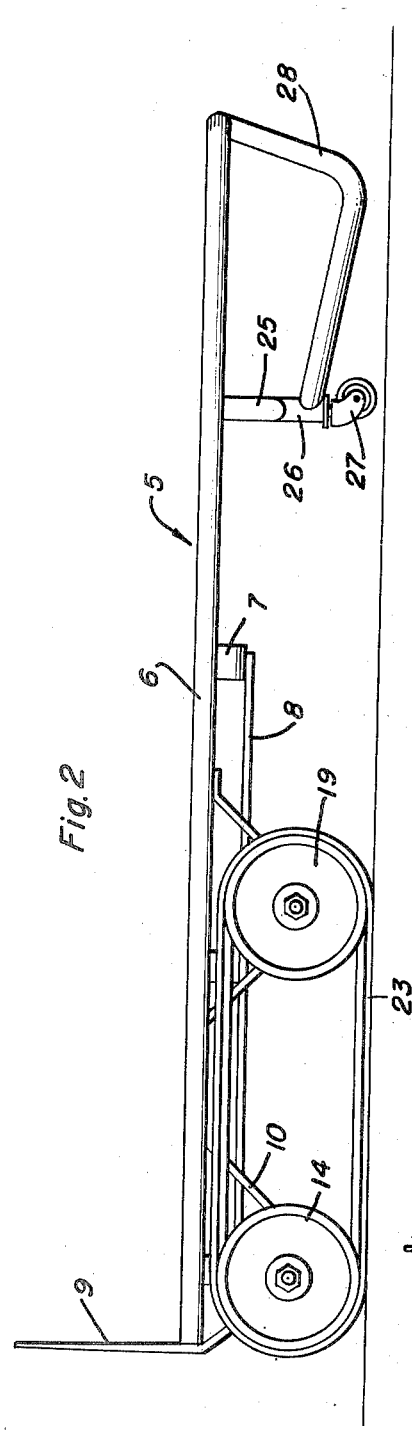
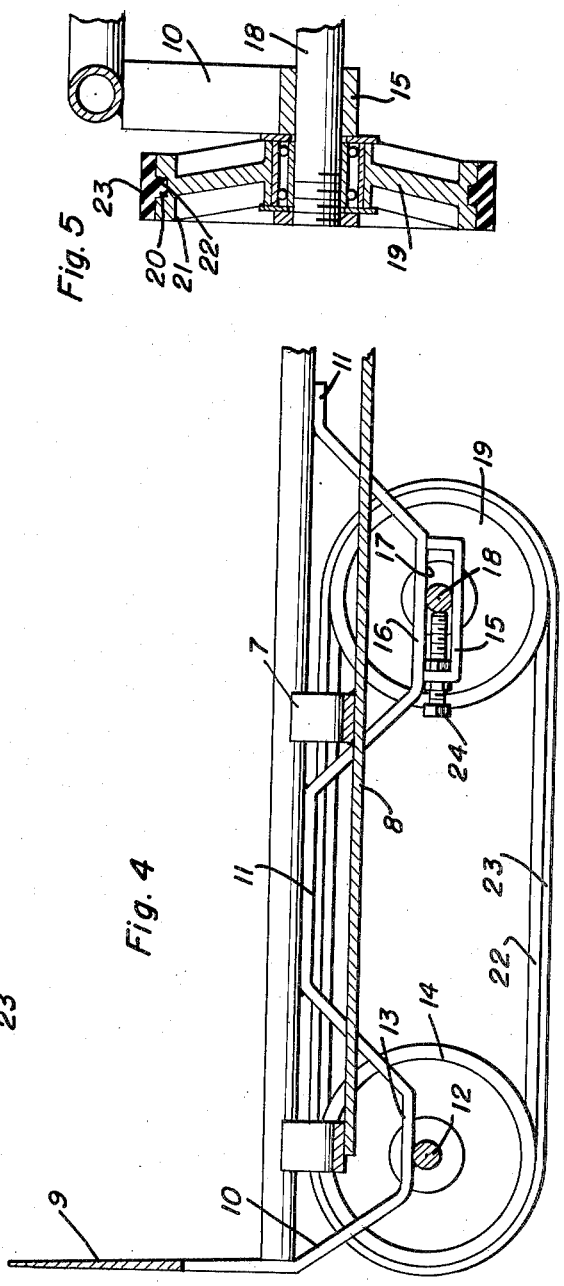
William I. Marsalis
INVENTOR.

United States Patent Office 2,763,489
Patented Sept. 18, 1956

2,763,489

HAND TRUCK PROVIDED WITH TRACK TYPE TREADS

William I. Marsalis, Jackson, Miss.

Application June 12, 1952, Serial No. 293,046

1 Claim. (Cl. 280—5.22)

The present invention relates to new and useful improvements in hand trucks and more particularly to endless or track type treads supporting the load to facilitate movement of the truck on stairs or on soft ground.

An important object of the invention is to provide track type treads at the front end of the truck and a swively mounted wheel at the rear end of the truck to balance the load when wheeling the truck in a horizontal position and mounting the rear wheel at a horizontal plane above the front treads whereby the truck may be tilted rearwardly and balanced on the rear wheels of the track type tread to pivot the truck horizontally for guiding in a desired direction.

Another object is to provide a device of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is a side elevational view;

Figure 3 is a front elevational view;

Figure 4 is an enlarged fragmentary longitudinal sectional view taken on a line 4—4 of Figure 1;

Figure 5 is an enlarged transverse sectional view of one of the wheels for the track type treads taken on a line 5—5 of Figure 1; and Figure 6 is a side elevational view on a reduced scale showing the position of the truck on stairs.

Referring now to the drawings in detail, wherein for the purpose of illustration I have disclosed a preferred embodiment of my invention, the numeral 5 designates a U-shaped truck frame preferably of tubular metal to provide side rails 6 rigidly connected to each other by downwardly curved transverse strap metal members 7. A center longitudinal strap metal member 8 is fixed to the transverse members 7 to form a cradle between the side rails.

A platform 9 is positioned at the front ends of side rails 6 and is formed with a pair of strap metal bars 10 welded or otherwise suitably secured to the ends of the side rails and extend rearwardly under the side rails and bent in vertically undulated form with their humps 11 welded to the side rails.

A front axle 12 is welded or otherwise suitably secured to the underside of the front valleys 13 of undulated bars 10 with front wheels 14 journaled on the front axle and U-shaped hangers 15 are welded to the rear valleys 16 of undulated bars 10 to form longitudinal slots 17 in which a rear axle 18 is longitudinally slidable. Wheels 19 are also journaled on axle 18.

Wheels 14 and 19 are formed with circumferential grooves 20 in their rims 21 to receive ribs 22 at the underside of endless or track type rubber or other flexible treads 23 which are tightened on the wheels by stop screws 24 at the front ends of hangers 15 and adjustably engaging rear axle 18.

A downwardly curved rear transverse member 25 is welded to side rails 6 and from the center of which a tubular wheel mounting 26 extends downwardly to swively receive a caster wheel 27 which is positioned above the horizontal plane of track type tread wheels 14 and 19. A handle 28 of tubular metal extends downwardly and rearwardly from the rear end of frame 5 and is welded to mounting 26 to mutually brace each other.

The cradle formed of transverse members 7 and longitudinal member 8 supports crates, barrels or other articles on the truck which may be wheeled in a horizontal position on the track type treads and guided by tilting the rear end of the truck downwardly on swivel wheel 27 whereby the truck may pivot horizontally on rear wheels 19 of the track type treads.

When the truck is tilted in the position shown in Figure 6 the track type treads may travel on stairs 29 or on level ground.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A hand truck comprising a frame including a pair of side rails, a platform at the front ends of the side rails, a pair of bars united with the platform and formed with undulations to provide humps and valleys, said humps being secured to the underside of the side rails with said valleys lying in a common plane, a front axle secured to a pair of the valleys of said bars, a U-shaped hanger secured to the underside of another of said valleys of each bar adjacent the rear ends of the latter, a rear axle slidably supported on said hangers, front and rear wheels journaled on the axles, endless treads on the wheels, and tread tightening screws carried by the hangers and engaging the rear axle.

References Cited in the file of this patent

UNITED STATES PATENTS

| Number | Name | Date |
|---|---|---|
| 447,606 | Gardner | Mar. 3, 1891 |
| 456,490 | Herz | July 21, 1891 |
| 728,957 | Moore | May 26, 1903 |
| 1,196,507 | Bates | Aug. 29, 1916 |
| 1,397,139 | Muscott | Nov. 15, 1921 |
| 1,542,327 | Slingsby | June 16, 1925 |
| 1,738,096 | Cole | Dec. 3, 1929 |
| 1,752,687 | Newhouser | Apr. 1, 1930 |
| 2,132,069 | Hall | Oct. 4, 1938 |
| 2,141,530 | Guidroz | Dec. 27, 1938 |
| 2,242,067 | Harris | May 13, 1941 |
| 2,301,341 | Stevens et al. | Nov. 10, 1942 |
| 2,422,254 | Peronti | June 17, 1947 |
| 2,423,065 | Garbarino | June 24, 1947 |
| 2,442,334 | Bailey | June 1, 1948 |
| 2,546,523 | Reynolds | Mar. 27, 1951 |
| 2,620,041 | Chenette et al. | Dec. 2, 1952 |

FOREIGN PATENTS

| 6,054 | Great Britain | Mar. 23, 1895 |
| 1895 | | |